May 28, 1935.   R. E. FLATLEY   2,002,532
THERMOCOUPLE
Filed Sept. 24, 1931
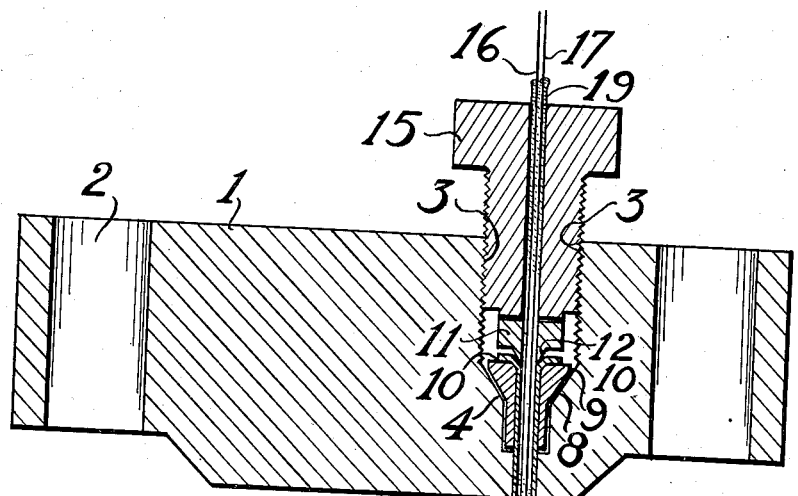
Fig.—1
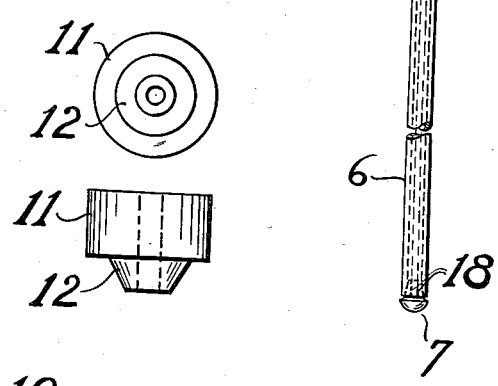
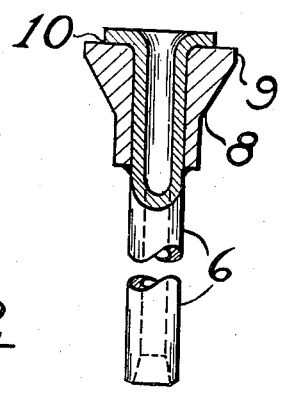
Fig.—2
Inventor
Richard E. Flatley
By
W. E. Currie  Attorney Patented May 28, 1935

2,002,532

UNITED STATES PATENT OFFICE 2,002,532

THERMOCOUPLE

Richard E. Flatley, Elizabeth, N. J., assignor to Standard Oil Development Company, a corporation of Delaware Application September 24, 1931, Serial No. 564,857

2 Claims. (Cl. 136—4)

This invention relates to an improved thermocouple and is more particularly directed to a thermocouple for use in measuring high temperatures of fluids and gases maintained under high pressure.

The invention will be fully understood from the following description taken in connection with the accompanying drawing in which latter—

Fig. 1 is a transverse sectional view through a fitting showing the thermocouple assembled therein, and Fig. 2 is a side elevational view of the thermocouple with its parts in disassembled position.

Referring particularly to the drawing, reference numeral 1 designates a fitting having holes 2 through which bolts are adapted to extend to secure the fitting to such a member as a shell or container into which the fitting opens. The fitting is provided with a hole extending therethru having a threaded portion 3 terminating in converging walls 4 at an intermediate portion of the fitting. The hole extends from the converging walls through the fitting.

A thermocouple extends through the hole and comprises a tube 6 and a closure 7 of iron welded to one end of the tube. The tube is provided with an inclined surface 8 adapted to engage the converging walls of the hole. The inclined surface is preferably machined to form a line contact joint with the converging walls. The inclined surface 8 is formed on a collar 9 which encircles and is welded to the tube adjacent the open end of the tube. The open end of the tube is flared over the collar at 10 thereby forming a further protection against leakage of vapors through the thermocouple. A tubular follower 11 is provided with converging end walls 12 which are adapted to engage the flared over portion of the tube. The device is secured in position in the fitting by means of a tubular nut 15 which is threaded into the hole of the fitting into engagement with the follower 11. The pressure of the nut forces the elements of the assembly into tight engagement with each other and with the converging walls 4 of the fitting. A pair of elements 16 and 17 of dissimilar metal such as iron and constantan extend through the nut 15, follower 11 and tube 6. The elements terminate in two holes 18 in the iron closure 7 where they fit tightly and are welded with iron in position forming a thermal junction. The elements are insulated from each other and from the walls of the tube 6, collar 11 and nut 15 by means of suitable insulation 19 such as asbestos or the like.

In assembling the device, or "Pyod", the elements of the two wire system after being insulated from each other are drawn through the nut 15, collar 11 and tube 6 and are welded in the closure 7. The closure is then welded in place sealing the end of the tube. The tube follower and nut are then assembled in the fitting with the nut forcing the elements together sufficiently tightly to form a vapor tight connection.

By the construction described a thermocouple is provided which gives accurate measurement of high temperatures. The thermocouple is adapted for use in measuring the temperature of the contents of receptacles which are under high pressure. The thermocouple forms a vapor tight seal with the walls of the fitting.

Various changes may be made within the scope of the appended claims in which it is desired to claim all novelty inherent in the invention as broadly as the prior art permits.

I claim:
1. A thermocouple comprising a tube having an open end with a tapered seat, a closure secured to the end with a cooperating tapered seat, and a pair of elements of dissimilar metal extending through the tube and secured to the closure to form a thermo-electric junction.

2. A thermocouple comprising a tube having an open end with a tapered seat, a closure secured to the end with a cooperative tapered seat, the closure having spaced openings in its inner face, and a pair of elements of dissimilar metal extending through the tube and secured to the closure at the openings to form a thermo-electric junction.

RICHARD E. FLATLEY.